United States Patent
Kawai

(10) Patent No.: US 12,463,725 B2
(45) Date of Patent: Nov. 4, 2025

(54) OPTICAL ADD/DROP MULTIPLEXER AND OPTICAL TRANSMISSION METHOD

(71) Applicant: NEC Corporation, Tokyo (JP)

(72) Inventor: Motoyoshi Kawai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1114 days.

(21) Appl. No.: 17/431,800

(22) PCT Filed: Mar. 9, 2020

(86) PCT No.: PCT/JP2020/009925
§ 371 (c)(1),
(2) Date: Aug. 18, 2021

(87) PCT Pub. No.: WO2020/195737
PCT Pub. Date: Oct. 1, 2020

(65) Prior Publication Data
US 2022/0140907 A1    May 5, 2022

(30) Foreign Application Priority Data
Mar. 25, 2019   (JP) ................. 2019-056433

(51) Int. Cl.
*H04B 10/296* (2013.01)
*H04B 10/03* (2013.01)
(Continued)

(52) U.S. Cl.
CPC .......... *H04B 10/296* (2013.01); *H04B 10/03* (2013.01); *H04B 10/079* (2013.01); *H04J 14/02122* (2023.08); *H04J 14/02216* (2023.08)

(58) Field of Classification Search
None
See application file for complete search history.

(56) References Cited

U.S. PATENT DOCUMENTS 9,800,331 B2 * 10/2017 Toyota ................. H04B 10/572
10,349,153 B2 * 7/2019 Kawai ................. H04J 14/0209
(Continued)

FOREIGN PATENT DOCUMENTS

| CN | 107925475 A | 4/2018 |
|----|-------------|--------|
| EP | 3166243 A1  | 5/2017 |

(Continued)

OTHER PUBLICATIONS

International Search Report for PCT Application No. PCT/JP2020/009925, mailed on May 19, 2020.
(Continued)

*Primary Examiner* — Jai M Lee

(57) ABSTRACT

An optical add/drop multiplexer includes: a first wavelength selector configured to output an optical signal of each wavelength of an inputted first wavelength multiplexed signal while selecting a path for each wavelength; a measurement circuit configured to measure optical power of an inputted optical signal; and a second wavelength selector including a circuit configured to output an optical signal of each wavelength of the first wavelength multiplexed signal while selecting a path for each wavelength, in place of the first wavelength selector when an abnormality occurs in the first wavelength selector, and a circuit configured to output an inputted second wavelength multiplexed signal for each prescribed wavelength unit to the measurement circuit when the first wavelength selector normally operates.

16 Claims, 11 Drawing Sheets

(51) Int. Cl.
  *H04B 10/079* (2013.01)
  *H04J 14/02* (2006.01)

(56) References Cited

U.S. PATENT DOCUMENTS

| | | | |
|---|---|---|---|
| 10,530,470 B2* | 1/2020 | Takigawa | H04B 10/27 |
| 10,541,749 B2* | 1/2020 | Ishii | H04J 14/0221 |
| 11,159,264 B2* | 10/2021 | Aida | H04J 14/0212 |
| 11,212,599 B2* | 12/2021 | Satyarthi | H04J 14/0227 |
| 2006/0210266 A1 | 9/2006 | Aoki | |
| 2010/0221004 A1* | 9/2010 | Haslam | H04J 14/0212 398/49 |
| 2016/0301467 A1* | 10/2016 | Ji | H04B 10/2589 |
| 2016/0308608 A1 | 10/2016 | Ejima et al. | |
| 2016/0315700 A1 | 10/2016 | Toyota et al. | |
| 2018/0069648 A1 | 3/2018 | Inada | |
| 2018/0070156 A1* | 3/2018 | Kawai | H04B 10/29 |
| 2018/0219819 A1 | 8/2018 | Takigawa | |
| 2019/0342027 A1 | 11/2019 | Kawai | |

FOREIGN PATENT DOCUMENTS

| | | |
|---|---|---|
| EP | 3176968 A1 | 6/2017 |
| EP | 3276854 A1 | 1/2018 |
| JP | 2004-266865 A | 9/2004 |
| JP | 2010-098545 A | 4/2010 |
| WO | 2016/147655 A1 | 9/2016 |
| WO | 2016/152115 A1 | 9/2016 |
| WO | 2017/022231 A1 | 2/2017 |
| WO | 2018/105506 A1 | 6/2018 |

OTHER PUBLICATIONS

English translation of Written opinion for PCT Application No. PCT/JP2020/009925, mailed on May 19, 2020.
Chinese Office Action for CN Application No. 202080016461.1, mailed on Oct. 14, 2023 with English Translation.
Extended European Search Report for EP Application No. EP20776884.7 dated on Apr. 14, 2022.

* cited by examiner

OPTICAL ADD/DROP MULTIPLEXER AND OPTICAL TRANSMISSION METHOD

This application is a National Stage Entry of PCT/JP2020/009925 filed on Mar. 9, 2020, which claims priority from Japanese Patent Application 2019-056433 filed on Mar. 25, 2019, the contents of all of which are incorporated herein by reference, in their entirety.

TECHNICAL FIELD

The present invention relates to an optical wavelength multiplexed transmission system, and more particularly, relates to an optical add/drop function.

BACKGROUND ART

An optical add/drop multiplexing (OADM) device introduced in a land optical communication network has started being applied to an optical submarine cable system. Thus, the optical submarine cable system can also accept network versatility. Meanwhile, in the optical submarine cable system, an OADM function is provided to a branching device installed on a seabed. Thus, it is desired that the OADM device have a small size and high reliability. Further, in a case where a network configuration is changed after implementation, when a setting change cannot be made from an outside, an action of pulling the branching device up on the land from the seabed, replacing an optical filter according to the network configuration to be changed, and the like may be required.

For the purpose of accepting a change of the network configuration after installation, the optical submarine cable system also uses a reconfigurable optical add/drop multiplexing (ROADM) device using a wavelength selective switch (WSS). A ROADM device disclosed in PTL 1 is an example of such a ROADM device using the wavelength selective switch. The ROADM device in PTL 1 includes a wavelength selective switch for splitting and insertion, and is configured in such a way as to switch optical signal paths. Further, PTL 2 discloses an optical add/drop multiplexer including a redundant unit.

CITATION LIST

Patent Literature

[PTL 1] Japanese Unexamined Patent Application Publication No. 2010-98545
[PTL 2] International Patent Publication No. WO2017/022231

SUMMARY OF INVENTION

Technical Problem

However, the technique of PTL 1 is not sufficient for the following reason. When the ROADM device is installed on the seabed, high reliability is required, and it is desired that stable transmission characteristics are maintained even when characteristics fluctuate due to a configuration change of a transmission path or the like or aging of each component. The ROADM device in PTL 1 may fail to maintain communication or stable transmission quality when a defect is caused in the wavelength selective switch or wavelength characteristics are changed, depending on a nature of the change in the characteristics. Thus, the technique of PTL 1 is not sufficient as a technique for maintaining stable communication in the optical add/drop multiplexer.

In order to solve the above-mentioned problem, an object of the present invention is to provide an optical add/drop multiplexer capable of continuing operation even when an abnormality occurs and maintaining stable transmission characteristics.

Solution to Problem

In order to solve the above-mentioned problem, an optical add/drop multiplexer according to the present invention includes a first wavelength selection means, a measurement means, and a second wavelength selection means. The first wavelength selection means outputs an optical signal of each wavelength of an inputted first wavelength multiplexed signal while selecting a path for each wavelength. The measurement means measures optical power of an inputted optical signal. The second wavelength selection means includes a means for outputting the optical signal of each wavelength of the first wavelength multiplexed signal while selecting a path for each wavelength, in place of the first wavelength selection means when an abnormality occurs in the first wavelength selection means. Further, the second wavelength selection means includes a means for outputting an inputted second wavelength multiplexed signal for each prescribed wavelength unit to the measurement means when the first wavelength selection means normally operates.

An optical transmission method according to the present invention includes outputting an optical signal of each wavelength of an inputted first wavelength multiplexed signal from a first wavelength selection switch while selecting a path for each wavelength. The optical transmission method according to the present invention includes outputting, as a measurement signal, a second wavelength multiplexed signal after being demultiplexed by a prescribed wavelength unit from a second wavelength selection switch, when the first wavelength selection switch operates normally. The optical transmission method according to the present invention includes measuring optical power of the measurement signal. The optical transmission method according to the present invention includes outputting an optical signal of each wavelength of the first wavelength multiplexed signal from the second wavelength selection switch while selecting a path for each wavelength, in place of the first wavelength selection switch when an abnormality occurs in the first wavelength selection switch.

Advantageous Effects of Invention

According to the present invention, operation can be continued even when an abnormality occurs, and stable transmission characteristics can be maintained.

EXAMPLE EMBODIMENT

First Example Embodiment

Figure 1:
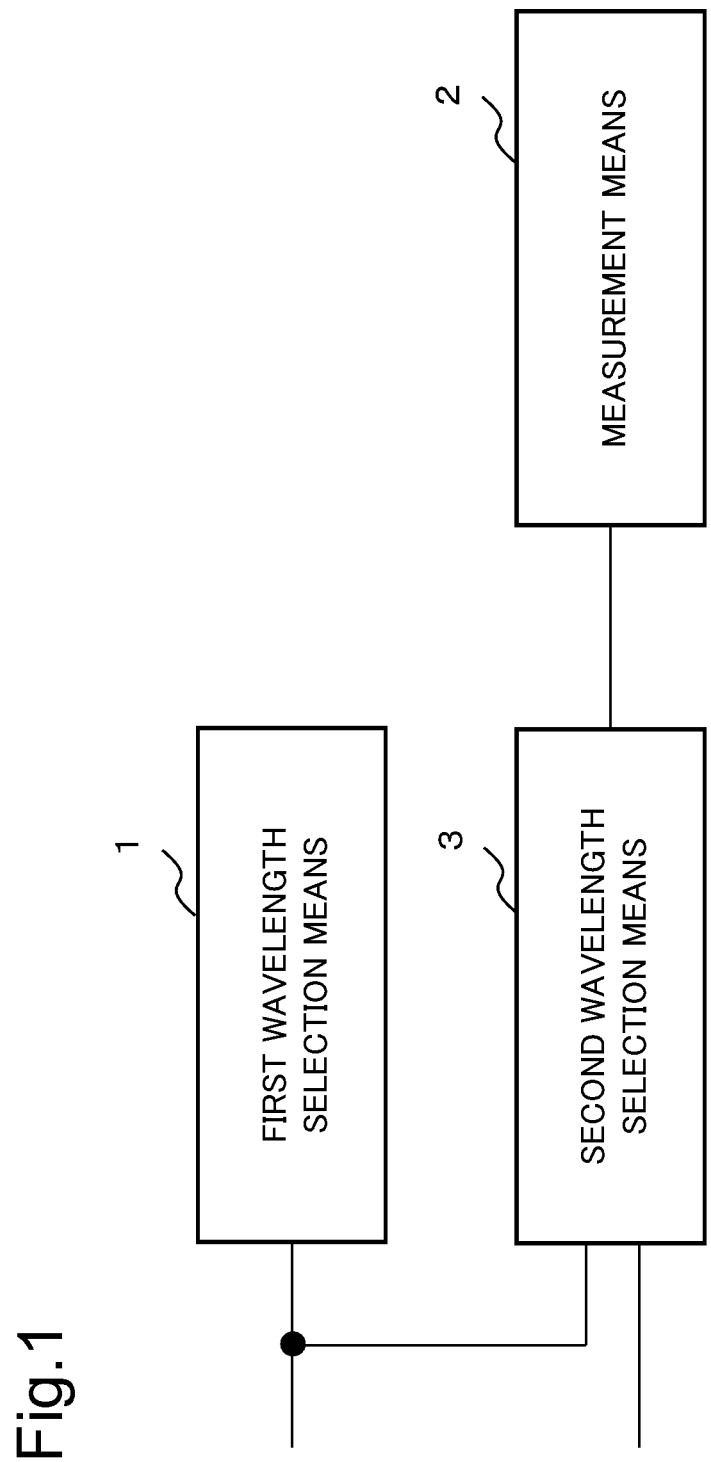
FIG. 1 is a diagram illustrating an outline of a configuration according to a first example embodiment of the present invention.

With reference to the drawings, a first example embodiment of the present invention is described in detail. FIG. 1 is a diagram illustrating an outline of a configuration of an optical add/drop multiplexer according to the present example embodiment. The optical add/drop multiplexer according to the present example embodiment includes a first wavelength selection means 1, a measurement means 2, and a second wavelength selection means 3. The first wavelength selection means 1 outputs an optical signal of each wavelength of an inputted first wavelength multiplexed signal while selecting a path for each wavelength. The measurement means 2 measures optical power of an inputted optical signal. The second wavelength selection means 3 includes a means for outputting the optical signal of each wavelength of the first wavelength multiplexed signal while selecting a path for each wavelength, in place of the first wavelength selection means 1 when an abnormality occurs in the first wavelength selection means 1. Further, the second wavelength selection means 3 includes a means for outputting an inputted second wavelength multiplexed signal for each prescribed wavelength unit to the measurement means 2 when the first wavelength selection means 1 normally operates.

During normal operation, the second wavelength selection means 3 of the optical add/drop multiplexer according to the present example embodiment outputs an optical signal for each prescribed wavelength unit to the measurement means 2, which measures optical power, thereby enabling measurement of a spectrum. Further, when an abnormality occurs in the first wavelength selection means 1, the second wavelength selection means 3 performs operation in place of the first wavelength selection means 1. Therefore, the optical add/drop multiplexer according to the present example embodiment is capable of acquiring data required for maintaining transmission characteristics while having redundancy. Thus, by using the optical add/drop multiplexer according to the present example embodiment, operation can be continued and stable transmission characteristics can be maintained even when an abnormality occurs.

Second Example Embodiment

Figure 2:
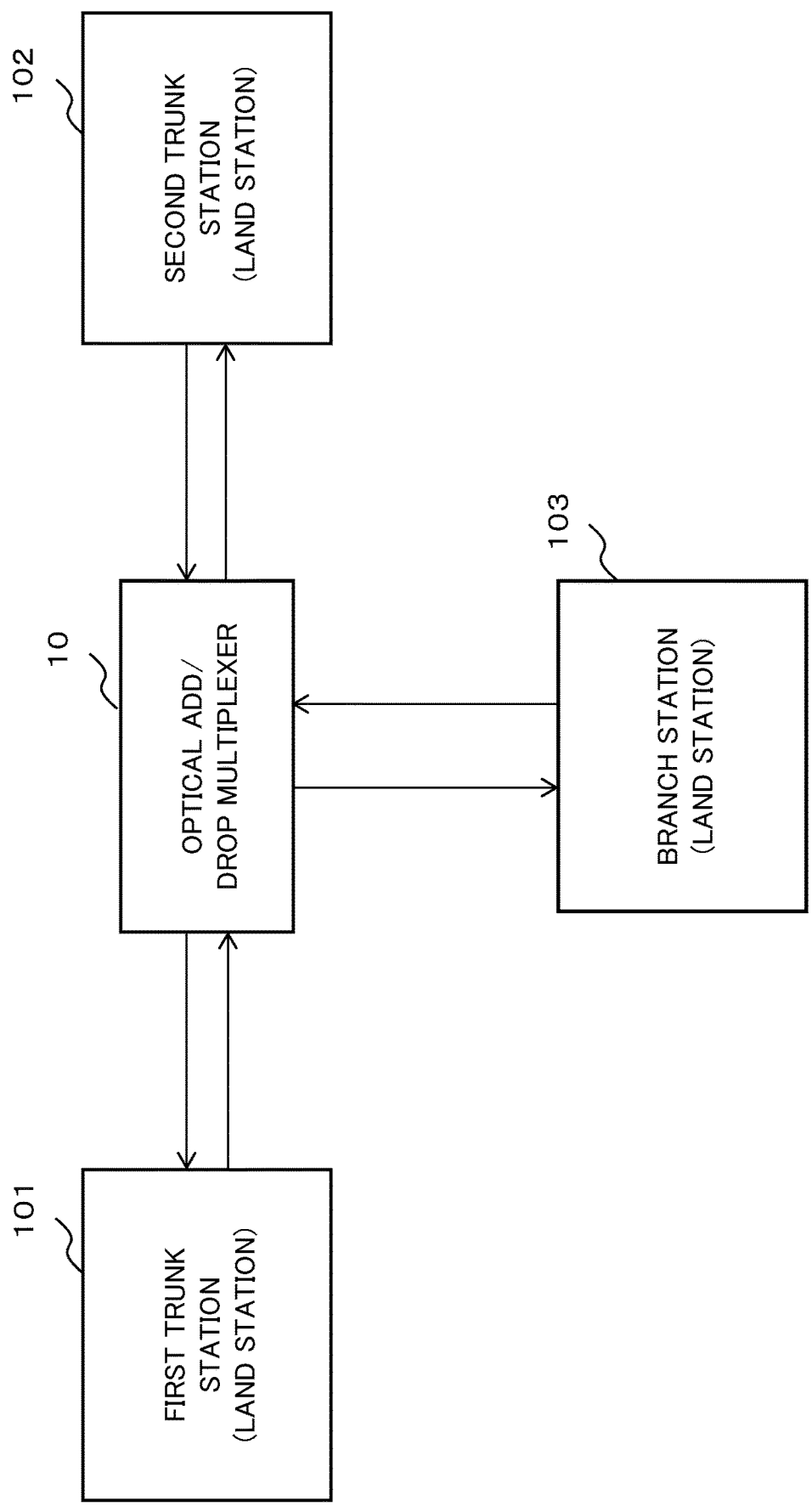
FIG. 2 is a diagram illustrating an outline of a configuration according to a second example embodiment of the present invention.

With reference to the drawings, a second example embodiment of the present invention is described in detail. FIG. 2 illustrates an outline of a configuration of an optical transmission system according to the present example embodiment. The optical transmission system according to the present example embodiment includes a first trunk station 101, a second trunk station 102, a branch station 103, and an optical add/drop multiplexer 10.

The optical transmission system according to the present example embodiment is configured as an optical submarine cable system. The first trunk station 101, the second trunk station 102, and the branch station 103 are included as land stations of the optical submarine cable system. Each of the land stations includes a terminal device, a power supply device, and the like. The land station transmits an optical wavelength multiplexed signal via an optical fiber cable, and supplies power to a submarine relay device via a power supply line included in the optical fiber cable.

Figure 3:
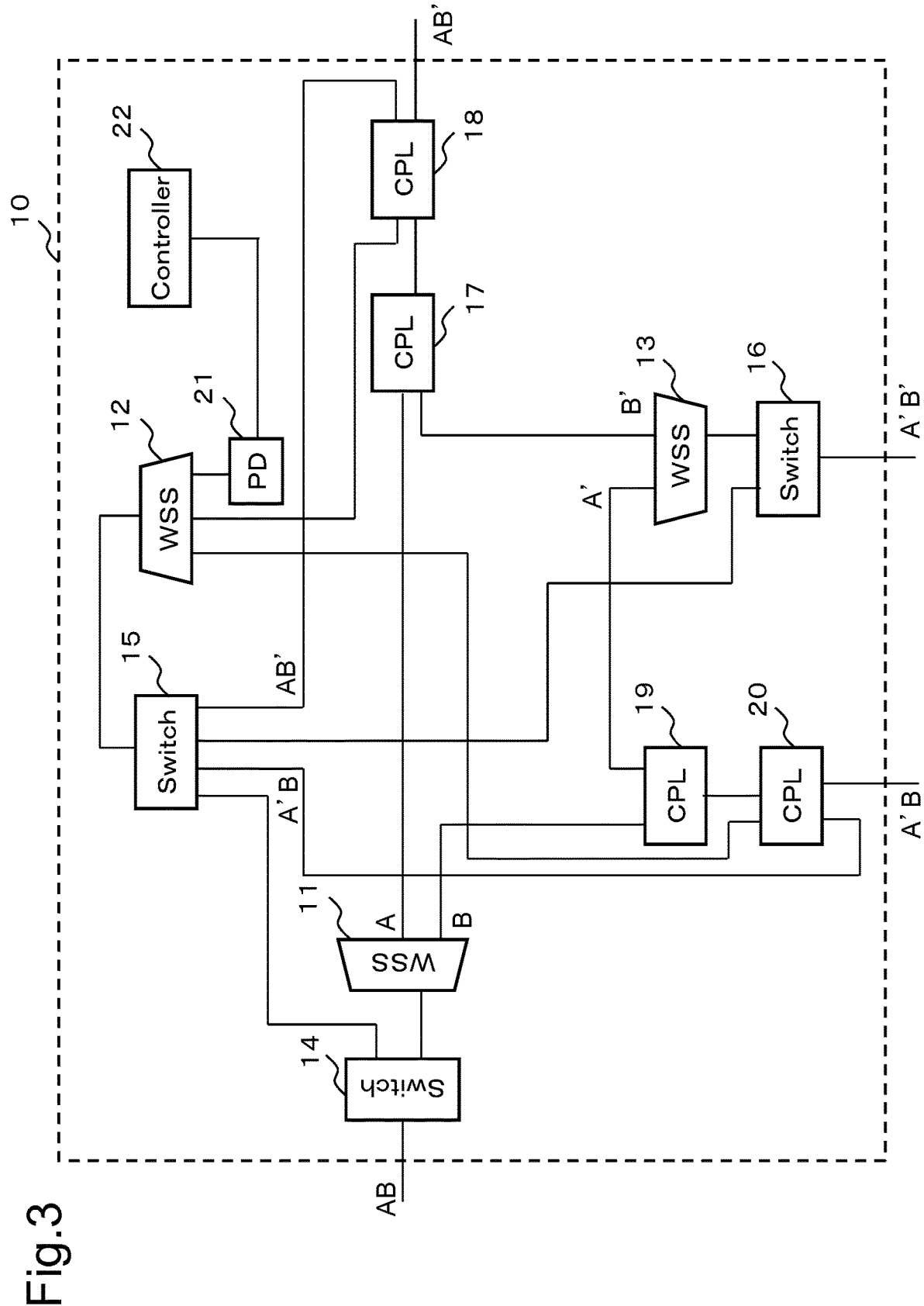
FIG. 3 is a diagram illustrating a configuration of an optical add/drop multiplexer according to the second example embodiment of the present invention.

A configuration of the optical add/drop multiplexer 10 is described. FIG. 3 illustrates an outline of the configuration of the optical add/drop multiplexer 10 according to the present example embodiment. The optical add/drop multiplexer 10 according to the present example embodiment is configured as a reconfigurable optical add/drop multiplexing (ROADM) device capable of reconfiguring a wavelength setting. FIG. 3 illustrates a function of splitting an optical signal partially to the branch station 103 and inserting an optical signal inputted from the branch station when a wavelength multiplexed signal is transmitted from the first trunk station 101 to the second trunk station 102. FIG. 3 illustrates an example in which a wavelength multiplexed signal of a wavelength A and a wavelength B is inputted from the first trunk station 101 to the optical add/drop multiplexer 10 and a wavelength multiplexed signal of a wavelength A' and a wavelength B' is inputted from the branch station 103 to the optical add/drop multiplexer 10. In the following description, each of the wavelength A, the wavelength A', the wavelength B, and the wavelength B' refers to a group containing an optical signal of a plurality of wavelengths. The optical signal included in each group may have one wavelength.

The optical add/drop multiplexer 10 according to the present example embodiment includes a first wavelength selection switch 11, a second wavelength selection switch 12, a third wavelength selection switch 13, a first switch 14, a second switch 15, and a third switch 16. Further, the optical add/drop multiplexer according to the present example embodiment includes a first coupler 17, a second coupler 18, a third coupler 19, a fourth coupler 20, an optical detector 21, and a control circuit 22. Further, for the purpose of transmitting a wavelength multiplexed signal from the second trunk station 102 to the first trunk station 101, the optical add/drop multiplexer 10 includes a similar configuration for a wavelength multiplexed signal in an opposite direction.

The first wavelength selection switch 11, the second wavelength selection switch 12, and the third wavelength selection switch 13 output, to a path selected for each wavelength, an optical signal of a selected wavelength, from among inputted optical signals. Each of the wavelength selection switches is configured by using a micro mechanical system (MEMS), for example. Each wavelength selection switch may be configured by using a liquid crystal on silicon (LCOS).

The first wavelength selection switch 11 is a wavelength selection switch that distributes an optical signal to each path when the first trunk station 101 transmits an optical signal to another land station via the optical add/drop multiplexer 10. Further, the function of the first wavelength selection switch 11 according to the present example embodiment is equivalent to the first wavelength selection means 1 according to the first example embodiment.

When the first wavelength selection switch 11 and the second wavelength selection switch 12 operate normally, the second wavelength selection switch 12 selects a wavelength of an optical signal for optical power measurement, and outputs the optical signal to the optical detector 21. Further, when an abnormality occurs in the first wavelength selection switch 11 or the third wavelength selection switch 13, the second wavelength selection switch 12 functions as an alternative wavelength selection switch in place of the wavelength selection switch in which the abnormality occurs. Further, the function of the second wavelength selection switch 12 according to the present example embodiment is equivalent to the second wavelength selection means 3 according to the first example embodiment.

The third wavelength selection switch 13 is a wavelength selection switch that distributes an optical signal to each path when the branch station 103 transmits an optical signal to another land station via the optical add/drop multiplexer 10.

The first switch 14 selects a path for an inputted optical signal and outputs the optical signal, based on control from the control circuit 22. The first switch 14 is a switch element that outputs the inputted signal to any one of the first wavelength selection switch 11 and the second switch 15.

When the first wavelength selection switch 11 normally operates and an optical signal is transmitted normally, the first switch 14 outputs the inputted optical signal to the first wavelength selection switch 11. Further, in a case where an abnormality occurs in the first wavelength selection switch 11 and the second wavelength selection switch 12 functions an alternative wavelength selection switch, the first switch 14 outputs the inputted optical signal to the second switch 15 that is connected to the second wavelength selection switch 12.

The second switch 15 is a switch element that selects an optical signal that is inputted from any one of the paths and outputs the optical signal to the third wavelength selection switch 13, based on control from the control circuit 22. The second switch 15 selects an optical signal that is inputted from any one of the first switch 14, the third switch 16, the second coupler 18, and the fourth coupler 20, and outputs the optical signal to the third wavelength selection switch 13.

The third switch 16 is a switch element that outputs an inputted optical signal to any one of the third wavelength selection switch 13 and the second switch 15.

When the third wavelength selection switch 13 operates normally and an optical signal is transmitted normally, the third switch 16 outputs the inputted optical signal to the third wavelength selection switch 13. Further, in a case where an abnormality occurs in the third wavelength selection switch 13 and the second wavelength selection switch 12 functions as an alternative wavelength selection switch, the third switch 16 outputs the inputted optical signal to the second switch 15 that is connected to the second wavelength selection switch 12.

The first coupler 17 and the third coupler 19 are optical couplers that multiplex inputted signals and output a resultant signal of multiplexing.

The second coupler 18 and the fourth coupler 20 are optical couplers that multiplex or demultiplex inputted signals and output a resultant signal of multiplexing or demultiplexing.

The optical detector 21 detects optical power of an inputted signal. The optical detector 21 includes a photodiode, and converts the inputted optical signal to an electric signal. The optical detector 21 converts the electric signal, which is converted from the optical signal, to a voltage signal, detects amplitude of the voltage signal, and regards the amplitude as an optical power measurement result. The optical detector 21 outputs, to the control circuit 22, a peak value or an average value of the measured optical power as a measurement result. Further, the function of the optical detector 21 according to the present example embodiment is equivalent to the measurement means 2 according to the first example embodiment.

Figure 4:
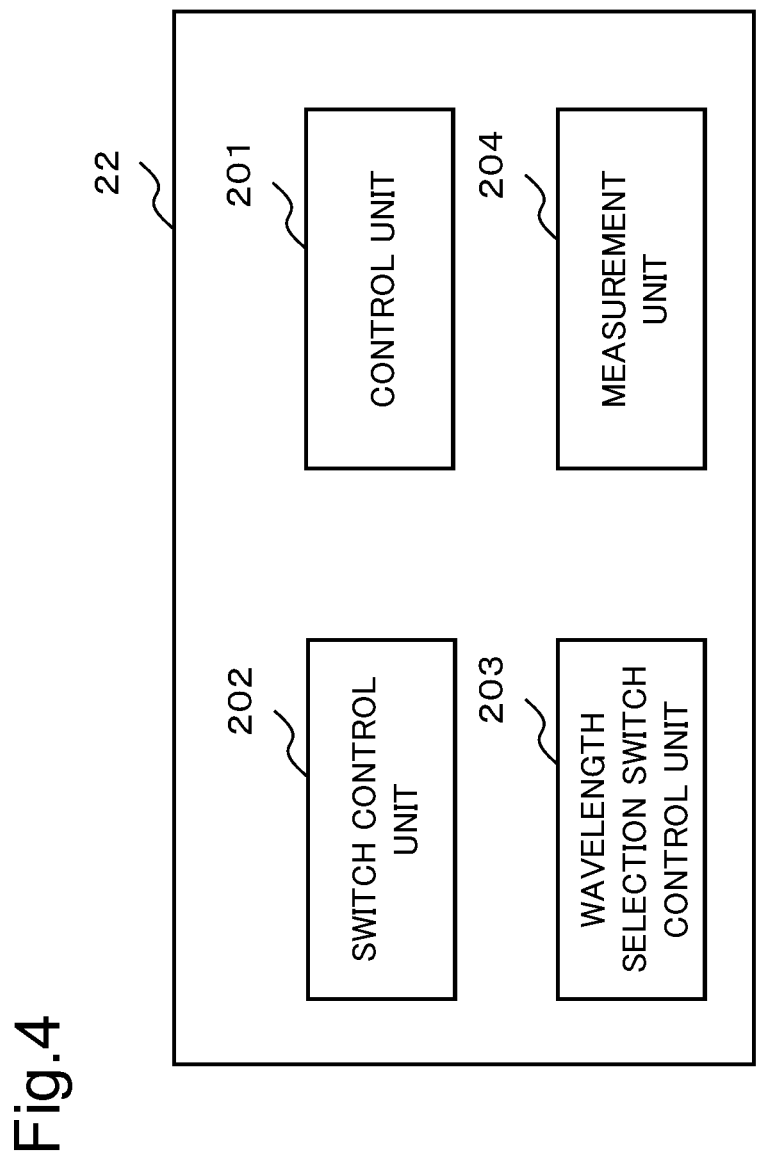
FIG. 4 is a diagram illustrating an example of a configuration of a control circuit according to the second example embodiment of the present invention.

The control circuit 22 controls each of the switch elements, and processes the measurement result that is inputted from the optical detector 21. For example, the control circuit 22 is configured by using a semiconductor device for each control and a non-volatile semiconductor memory. FIG. 4 is a diagram illustrating an example of a configuration of the control circuit 22 according to the present example embodiment. The control circuit 22 in FIG. 4 includes a control unit 201, a switch control unit 202, a wavelength selection switch control unit 203, and a measurement unit 204.

The control unit 201 controls the entire optical add/drop multiplexer 10, and monitors presence or absence of an abnormality in each component. Further, the control unit 201 communicates with a terminal device and the like of a land station via a transmission path. The control unit 201 switches each of the switches and the wavelength selection switches via the switch control unit 202 and the wavelength selection switch control unit 203, and sets a path for an optical signal. Further, when the measurement unit 204 measures an optical spectrum, the control unit 201 switches each of the switches and the second wavelength selection switch 12 via the switch control unit 202 and the wavelength selection switch control unit 203.

The switch control unit 202 controls switching of the switch elements, which are the first switch 14, the second switch 15, and the third switch 16.

The wavelength selection switch control unit 203 controls switching of internal paths of the first wavelength selection switch 11, the second wavelength selection switch 12, and the third wavelength selection switch 13.

The control circuit 22 is connected to each of the first wavelength selection switch 11, the second wavelength selection switch 12, the third wavelength selection switch 13, the first switch 14, the second switch 15, and the third switch 16 via a signal line that is not illustrated.

Operation of the optical transmission system according to the present example embodiment is described. First, operation when the optical add/drop multiplexer 10 operates normally is described. The following description is made while assuming that the wavelength multiplexed signal of the wavelength A and the wavelength B is inputted from the first trunk station 101 to the optical add/drop multiplexer 10 and that the wavelength A' and the wavelength B' are inputted from the branch station to the optical add/drop multiplexer 10.

The wavelength multiplexed signal of the wavelength A and the wavelength B that is inputted from the first trunk station 101 is inputted to the first wavelength selection switch 11 via the first switch 14. The first wavelength selection switch 11 transmits an optical signal of the wavelength A to the first coupler 17, and transmits an optical signal of the wavelength B to the third coupler 19.

Further, the wavelength multiplexed signal of the wavelength A' and the wavelength B' that is inputted from the branch station 103 is transmitted to the third wavelength selection switch 13 via the third switch 16. The third wavelength selection switch 13 transmits an optical signal of the wavelength A' to the third coupler 19, and transmits an optical signal of the wavelength B' to the first coupler 17.

When receiving the optical signal of the wavelength A and the optical signal of the wavelength B', the first coupler 17 multiplexes the optical signals having the two wavelength groups, and transmits the resultant wavelength multiplexed signal to the second coupler 18. When receiving the wavelength multiplexed signal of the wavelength A and the wavelength B', the second coupler 18 splits the wavelength multiplexed signal in such a way that all the wavelengths are included in both two paths for output destinations, outputs one signal to a transmission path to the second trunk station 102, and transmits the other signal to the second switch 15. The wavelength multiplexed signal of the wavelength A and the wavelength B' that is outputted from the optical add/drop multiplexer 10 is transmitted to the second trunk station 102 via the transmission path.

When receiving the wavelength multiplexed signal of the wavelength A' and the wavelength B, the third coupler 19 multiplexes the optical signals having the two wavelength groups, and transmits the resultant wavelength multiplexed signal to the fourth coupler 20. When receiving the wavelength multiplexed signal of the wavelength A' and the wavelength B, the fourth coupler 20 splits the wavelength multiplexed signal in such a way that all the wavelengths are included in both two paths for output destinations, outputs one signal to a transmission path to the branch station 103, and transmits the other signal to the second switch 15.

The wavelength multiplexed signal of the wavelength A' and the wavelength B that is outputted from the optical add/drop multiplexer 10 is transmitted to the branch station 103 via the transmission path.

Next, measurement of optical power of an optical signal, which is performed by the optical detector 21, is described.

When optical power of an optical signal is measured, the switch control unit 202 of the control circuit 22 switches the second switch 15 in such a way that an optical signal being a measurement target is transmitted to the second wavelength selection switch 12.

When optical power of the wavelength multiplexed signal of the wavelength A and the wavelength B' is measured, the switch control unit 202 controls the second switch 15 in such a way that the wavelength multiplexed signal of the wavelength A and the wavelength B', which is transmitted from the second coupler 18 to the second switch 15, is outputted to the second wavelength selection switch 12.

Under a state in which the wavelength A and the wavelength B' are inputted to the second wavelength selection switch 12, the wavelength selection switch control unit 203 of the control circuit 22 controls the second wavelength selection switch 12 in such a way that optical signals are outputted to the optical detector 21 sequentially for each of the wavelengths.

When the optical signal is inputted, the optical detector 21 measures optical power, and transmits the measurement result to the control circuit 22. When the measurement result of the optical power is inputted, the measurement unit 204 of the control circuit 22 stores the wavelength of the optical signal, which is outputted from the second wavelength selection switch 12 to the optical detector 21, and the measurement result of the optical power in association with each other.

When the optical signals are outputted and measured for all the wavelengths, the measurement unit 204 of the control circuit 22 generates spectrum data relating to the wavelength multiplexed signal of the wavelength A and the wavelength B'.

Subsequently, when measurement of optical power of the wavelength multiplexed signal of the wavelength A' and the wavelength B is started, the switch control unit 202 of the control circuit 22 controls the second switch 15 in such a way that the wavelength multiplexed signal of the wavelength A' and the wavelength B, which is transmitted from the fourth coupler 20 to the second switch 15, is outputted to the second wavelength selection switch 12.

Under a state in which the wavelength A' and the wavelength B are inputted to the second wavelength selection switch 12, the wavelength selection switch control unit 203 of the control circuit 22 controls the second wavelength selection switch 12 in such a way that optical signals are outputted to the optical detector 21 sequentially for each of the wavelengths.

When the optical signals are inputted, the optical detector 21 measures optical power, and transmits the measurement result to the control circuit 22. When the measurement result of the optical power is inputted, the measurement unit 204 of the control circuit 22 stores the wavelength of the optical signal, which is outputted from the second wavelength selection switch 12 to the optical detector 21, and the measurement result of the optical power in association with each other.

When the optical signals are outputted and measured for all the wavelengths, the measurement unit 204 generates spectrum data relating to the wavelength multiplexed signal of the wavelength A' and the wavelength B.

The inputted signal of the wavelength A and the wavelength B or the inputted signal of the wavelength A' and the wavelength B' is also transmitted to the second wavelength selection switch 12 via the second switch 15 by switching the first switch 14 or the third switch 16, thereby enabling measurement of optical power and generation of spectrum data.

Figure 5:
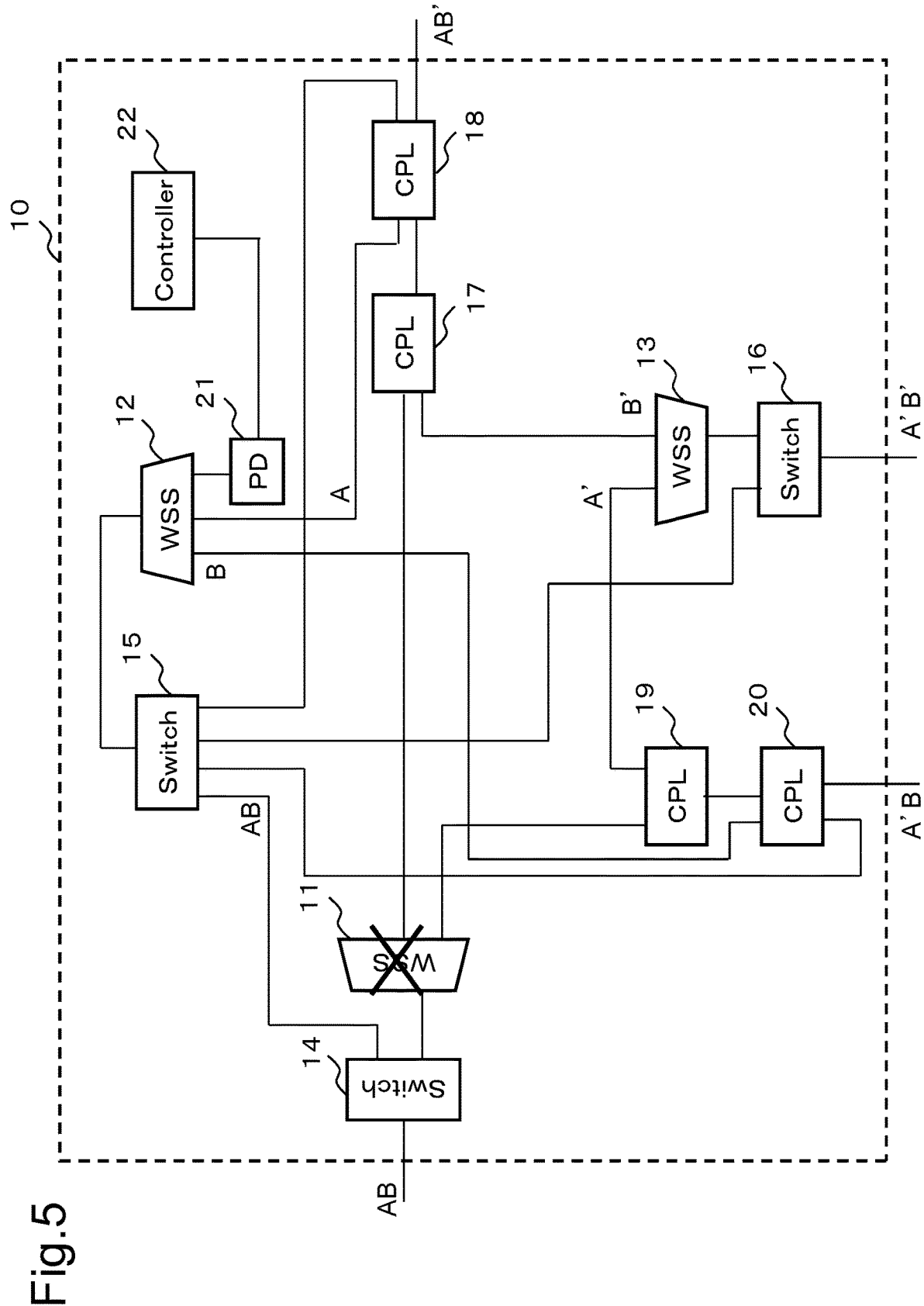
FIG. 5 is a diagram schematically illustrating a state in which an abnormality occurs in the second example embodiment of the present invention.

Next, operation when an abnormality occurs in any one of the first wavelength selection switch 11 and the third wavelength selection switch 13 is described. First, a case where an abnormality occurs in the first wavelength selection switch 11 is described. FIG. 5 illustrates an example in a case where an abnormality occurs in the first wavelength selection switch 11 of the optical add/drop multiplexer 10.

When an abnormality in the first wavelength selection switch 11 is detected, the control unit 201 of the control circuit 22 switches the first switch 14 via the switch control unit 202, and prevents the inputted optical signal from being transmitted to the second switch 15. At this point, no optical signal is inputted to the first wavelength selection switch 11.

When the first switch 14 is switched, the control unit 201 of the control circuit 22 switches the second switch 15 via the switch control unit 202 in such a way that the wavelength multiplexed signal of the wavelength A and the wavelength B', which is inputted from the first switch 14, is inputted to the second wavelength selection switch 12.

When the first switch 14 and the second switch 15 are switched, the control unit 201 of the control circuit 22 controls the second wavelength selection switch 12 via the wavelength selection switch control unit 203, and sets the second wavelength selection switch 12 to a state in which the optical signal of the wavelength A is transmitted to the second coupler 18 and the optical signal of the wavelength B is transmitted to the fourth coupler 20. When the setting is changed, among the inputted optical signals, the second wavelength selection switch 12 transmits the optical signal of the wavelength A to the second coupler 18, and transmits the optical signal of the wavelength B to the fourth coupler 20.

When receiving the optical signal of the wavelength B' from the third wavelength selection switch 13, the first coupler 17 transmits the received optical signal of the wavelength B' to the second coupler 18. When receiving the optical signal of the wavelength A from the second wavelength selection switch 12 and the optical signal of the wavelength B' from the first coupler 17, the second coupler 18 multiplexes the optical signals having the two wavelength groups, splits the resultant wavelength multiplexed signal in such a way that all the wavelengths are included in both two paths for output destinations, outputs one signal to the transmission path to the second trunk station 102, and transmits the other signal to a path to the second switch 15.

The wavelength multiplexed signal of the wavelength A and the wavelength B', which is outputted from the optical add/drop multiplexer 10, is transmitted to the second trunk station 102 via the transmission path.

When receiving the optical signal of the wavelength A' from the third wavelength selection switch 13, the third coupler 19 transmits the received optical signal of the wavelength A' to the fourth coupler 20. When receiving the optical signal of the wavelength B from the second wavelength selection switch 12 and the optical signal of the wavelength A' from the third coupler 19, the fourth coupler 20 multiplexes the optical signals having the two wavelength groups. The fourth coupler 20 splits the resultant wavelength multiplexed signal in such a way that all the wavelengths are included in both two paths for output destinations, outputs one signal to the transmission path to the branch station 103 and transmits the other signal to the second switch 15.

The wavelength multiplexed signal of the wavelength A' and the wavelength B that is outputted from the optical add/drop multiplexer 10 is transmitted to the branch station 103 via the transmission path.

When an abnormality occurs in the first wavelength selection switch 11, the operation as described above enables the second wavelength selection switch 12 to split an optical signal in place of the first wavelength selection switch 11, and thus the optical add/drop multiplexer 10 is capable of executing processing similar to the processing before the abnormality occurs.

Figure 6:
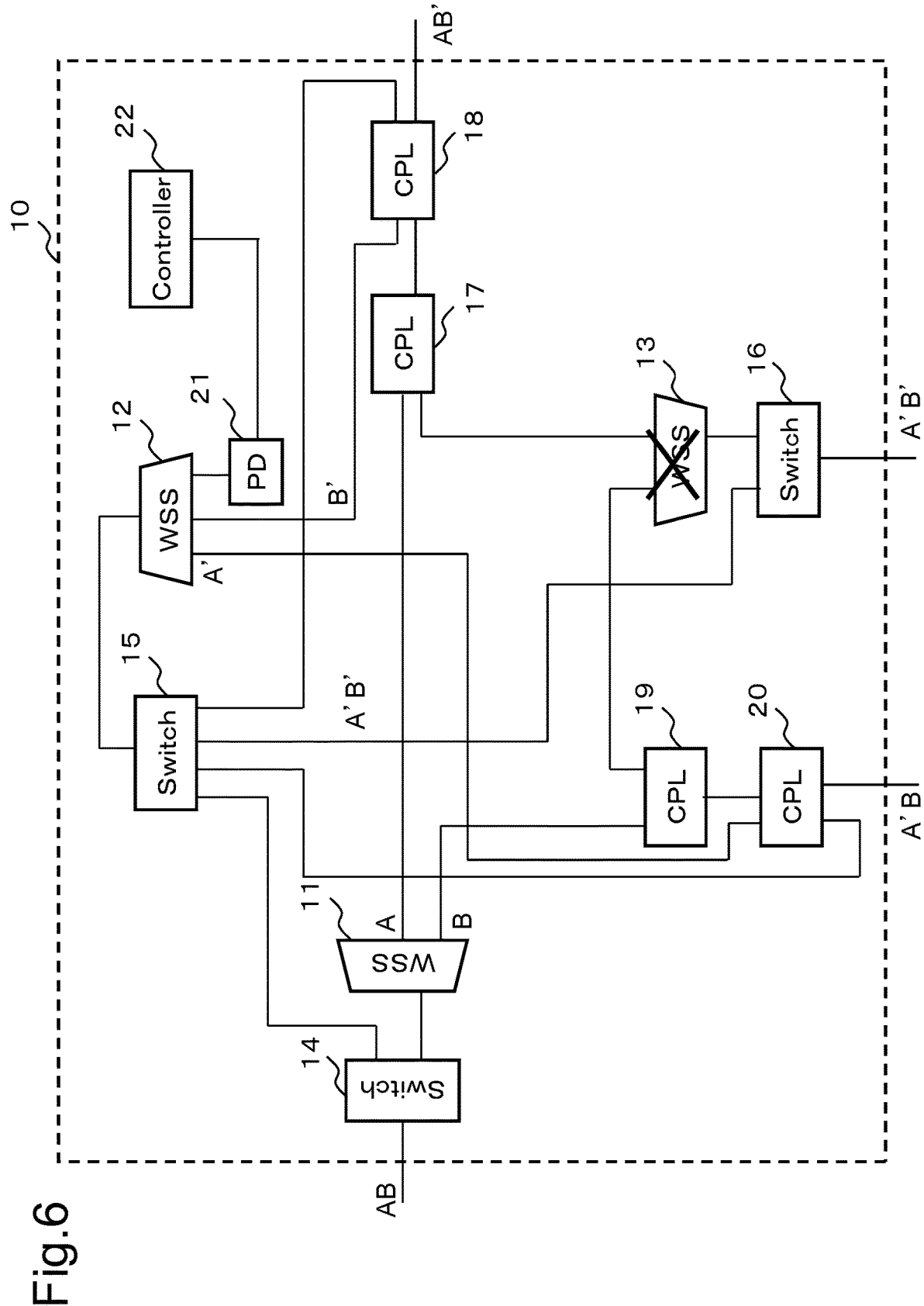
FIG. 6 is a diagram schematically illustrating a state in which an abnormality occurs in the second example embodiment of the present invention.

Next, a case where an abnormality occurs in the third wavelength selection switch 13 is described. FIG. 6 illustrates an example in which an abnormality occurs in the third wavelength selection switch 13 of the optical add/drop multiplexer 10.

When an abnormality in the third wavelength selection switch 13 is detected, the control unit 201 of the control circuit 22 switches the third switch 16 via the switch control unit 202, and prevents the inputted optical signal from being transmitted to the second switch 15. At this point, no optical signal is inputted to the third wavelength selection switch 13.

When the third switch 16 is switched, the control unit 201 of the control circuit 22 switches the second switch 15 via the switch control unit 202 in such a way that the wavelength multiplexed signal of the wavelength A' and the wavelength B', which is inputted from the third switch 16, is inputted to the second wavelength selection switch 12.

When the third switch 16 and the second switch 15 are switched, the control unit 201 of the control circuit 22 controls the second wavelength selection switch 12 via the wavelength selection switch control unit 203, and sets the second wavelength selection switch 12 to a state in which the optical signal of the wavelength A' is transmitted to the fourth coupler 20 and the optical signal of the wavelength B' is transmitted to the second coupler 18. When the setting is changed, among the inputted signals, the second wavelength selection switch 12 transmits the optical signal of the wavelength A' to the fourth coupler 20, and transmits the optical signal of the wavelength B' to the second coupler 18.

When receiving the optical signal of the wavelength A from the first wavelength selection switch 11, the first coupler 17 transmits the received optical signal of the wavelength A to the second coupler 18. When receiving the wavelength multiplexed signal of the wavelength A from the first coupler 17 and the wavelength B' from the second wavelength selection switch 12, the second coupler 18 multiplexes the optical signals having the two wavelength groups. The second coupler 18 splits the resultant wavelength multiplexed signal in such a way that all the wavelengths are included in both two paths for output destinations, outputs one signal to the transmission path to the second trunk station 102, and transmits the other signal to the path to the second switch 15.

The wavelength multiplexed signal of the wavelength A and the wavelength B', which is outputted from the optical add/drop multiplexer 10, is transmitted to the second trunk station 102 via the transmission path.

When receiving the optical signal of the wavelength B from the first wavelength selection switch 11, the third coupler 19 transmits the received optical signal of the wavelength B to the fourth coupler 20. When receiving the optical signal of the wavelength A' from the second wavelength selection switch 12 and the optical signal of the wavelength B from the third coupler 19, the fourth coupler 20 multiplexes the optical signals having the two wavelength groups. The fourth coupler 20 splits the resultant wavelength multiplexed signal in such a way that all the wavelengths are included in both two paths for output destinations, transmits one signal to the transmission path to the branch station 103 and transmits the other signal to the second switch 15.

The wavelength multiplexed signal of the wavelength A' and the wavelength B that is outputted from the optical add/drop multiplexer 10 is transmitted to the branch station 103 via the transmission path.

When an abnormality occurs in the third wavelength selection switch 13, the operation as described above enables the second wavelength selection switch 12 to split an optical signal in place of the third wavelength selection switch 13, and thus the optical add/drop multiplexer 10 is capable of executing processing similar to the processing before the abnormality occurs.

The optical add/drop multiplexer 10 of the optical transmission system according to the present example embodiment includes the second wavelength selection switch 12 as a standby wavelength selection switch, in addition to the first wavelength selection switch 11 and the third wavelength selection switch 13 that performs operation of splitting an optical signal during normal operation. When an abnormality occurs in the first wavelength selection switch 11 or the third wavelength selection switch 13, the second wavelength selection switch 12 is capable of executing processing of distributing an optical signal to each path, in place of the wavelength selection switch in which the abnormality occurs. Further, in the optical add/drop multiplexer 10 of the optical transmission system according to the present example embodiment, the second wavelength selection switch 12 sequentially changes wavelengths to be outputted, and outputs an optical signal, which has a wavelength being a measurement target, to the optical detector 21. In this manner, the second wavelength selection switch 12 outputs the wavelength to the optical detector 21 while changing the wavelength, and thus optical power of an optical signal can be measured for each wavelength even when the optical detector 21 does not have a function of extracting a wavelength. Therefore, the optical add/drop multiplexer 10 according to the present example embodiment is capable of improving reliability due to redundancy of the wavelength selection switches without increasing a size of the device configuration, and is capable of acquiring data for the purpose of maintaining transmission quality from spectrum measurement. Thus, by using the optical add/drop multiplexer 10 according to the present example embodiment, operation can be continued, and stable transmission characteristics can be maintained even when an abnormality occurs.

Third Example Embodiment

Figure 7:
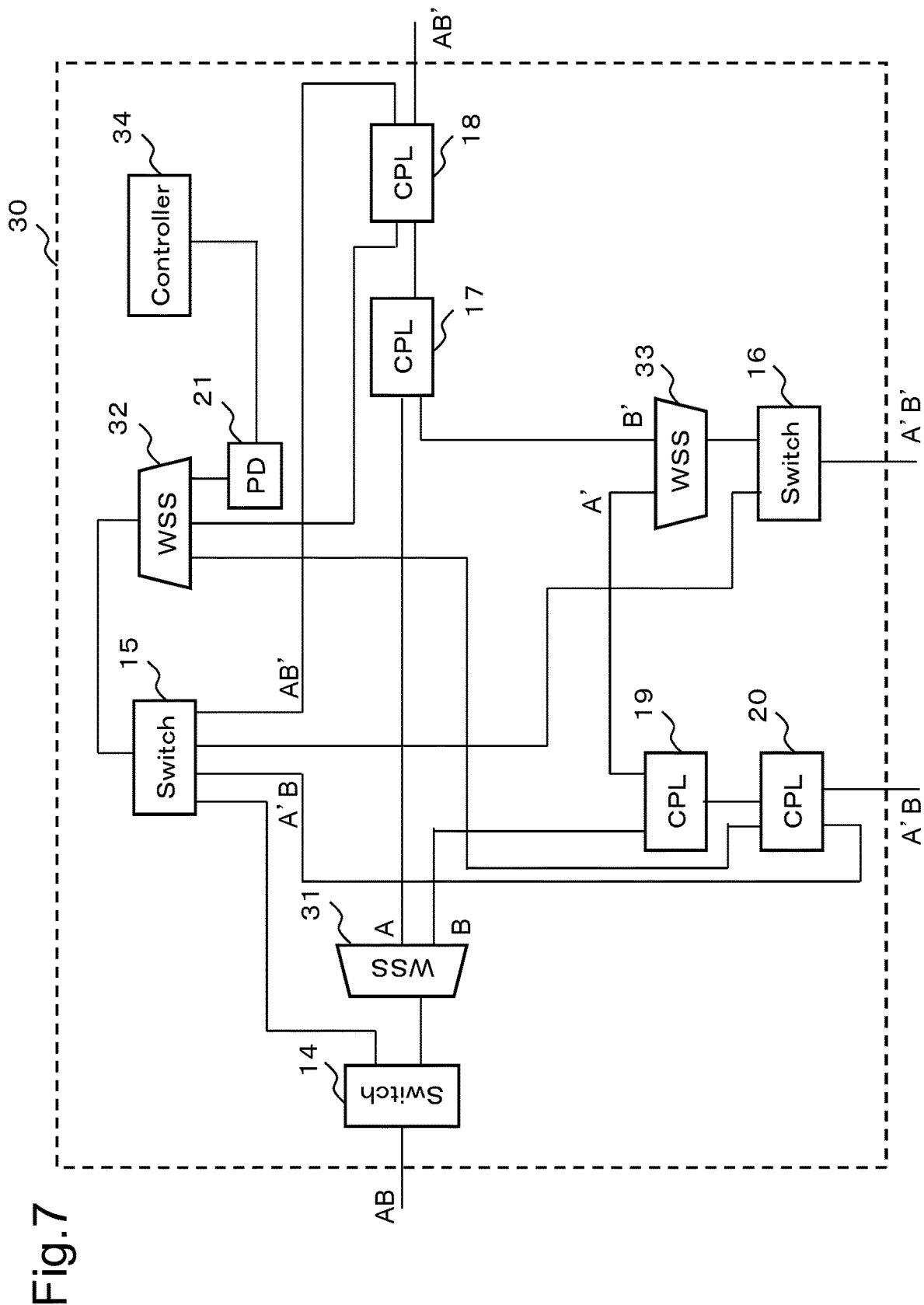
FIG. 7 is a diagram illustrating a configuration of an optical add/drop multiplexer according to a third example embodiment of the present invention.

With reference to the drawings, a third example embodiment of the present invention is described in detail. FIG. 7 illustrates an outline of a configuration of an optical add/drop multiplexer 30 according to the present example embodiment. The optical add/drop multiplexer 30 according to the present example embodiment is configured as a ROADM device capable of reconfiguring a wavelength setting. The optical add/drop multiplexer 30 according to the present example embodiment can be used in an optical transmission system similar to that of the second example embodiment. Specifically, in place of the optical add/drop multiplexer 10 of the optical transmission system according to the second example embodiment, the optical add/drop multiplexer 30 according to the present example embodiment can be used.

The optical add/drop multiplexer 10 according to the second example embodiment includes a standby wavelength selection switch and a function of measuring optical power. In addition to the functions similar to those in the second example embodiment, the optical add/drop multiplexer 30 according to the present example embodiment has a feature of controlling a transmittance for each wavelength through a wavelength selection switch and adjusting a spectrum to be outputted.

The optical add/drop multiplexer 30 according to the present example embodiment includes a first wavelength selection switch 31, a second wavelength selection switch 32, a third wavelength selection switch 33, a first switch 14, a second switch 15, and a third switch 16. Further, the optical add/drop multiplexer according to the present example embodiment includes a first coupler 17, a second coupler 18, a third coupler 19, a fourth coupler 20, an optical detector 21, and a control circuit 34.

The configurations and the functions of the first switch 14, the second switch 15, the third switch 16, the first coupler 17, the second coupler 18, the third coupler 19, the fourth coupler 20, and the optical detector 21 according to the present example embodiment are similar to those of the components given the same names in the second example embodiment.

The first wavelength selection switch 31, the second wavelength selection switch 32, and the third wavelength selection switch 33 have functions similar to those of the components given the same names in the second example embodiment. Further, the first wavelength selection switch 31, the second wavelength selection switch 32, and the third wavelength selection switch 33 have a function of adjusting a transmittance for each wavelength and shaping a spectrum, based on control from the control circuit 34.

Figure 8:
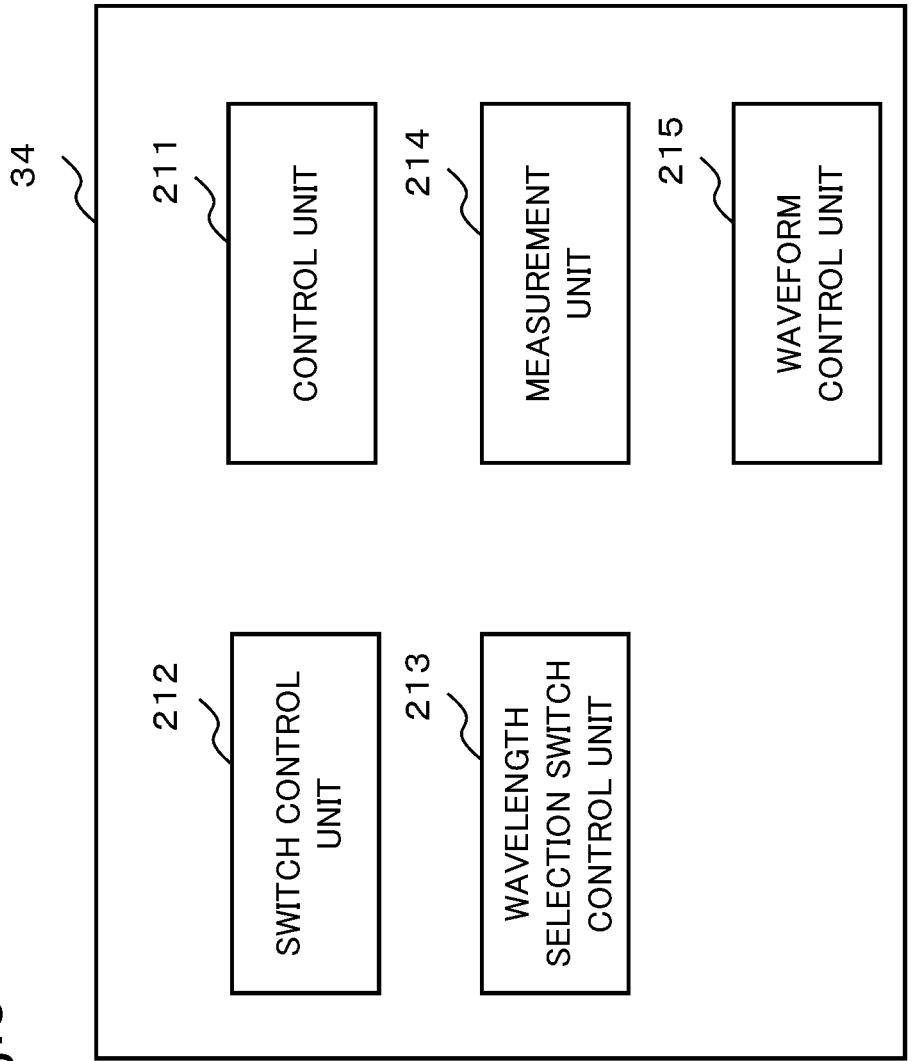
FIG. 8 is a diagram illustrating an example of a configuration of a control circuit according to the third example embodiment of the present invention.

The control circuit 34 controls each switch element, and processes a measurement result that is inputted from the optical detector 21. FIG. 8 is a diagram illustrating an example of a configuration of the control circuit 34 according to the present example embodiment. The control circuit 34 in FIG. 8 includes a control unit 211, a switch control unit 212, a wavelength selection switch control unit 213, a measurement unit 214, and a waveform control unit 215.

The wavelength selection switch control unit 213 controls switching of internal paths of the first wavelength selection switch 31, the second wavelength selection switch 32, and the third wavelength selection switch 33. Further, the wavelength selection switch control unit 213 controls a transmittance for each wavelength through each of the wavelength selection switches, based on information relating to a correction amount of a transmittance that is calculated by the waveform control unit 215, and adjusts optical power of an optical signal of each wavelength, which is outputted by each of the wavelength selection switches.

The waveform control unit 215 compares spectrum data generated by the measurement unit 214 and reference data, which is stored in advance, with each other, and calculates a correction amount of a transmittance in each wavelength selection switch. The waveform control unit 215 stores in advance, as the reference data, spectrum data being a reference for a wavelength multiplexed signal for each wavelength group or each transmission path to a destination. The reference data may be transmitted from a terminal device to the optical add/drop multiplexer 30 via a communication monitoring line.

The control circuit 34 is connected to each of the first wavelength selection switch 31, the second wavelength selection switch 32, the third wavelength selection switch 33, the first switch 14, the second switch 15, and the third switch 16 via a signal line that is not illustrated.

Operation of the optical add/drop multiplexer 30 according to the present example embodiment is described. Operation of the optical add/drop multiplexer 30 according to the present example embodiment during normal operation, operation at the time of acquiring the spectrum data, and operation when an abnormality occurs in a wavelength selection switch are similar to those in the second example embodiment. Thus, the following description is made on operation in a case where a spectrum of an outputted signal of a wavelength selection switch is adjusted based on measured spectrum data.

When the measurement unit 214 generates data relating to a spectrum, the waveform control unit 215 of the control circuit 34 compares the generated spectrum data and the reference data with each other, and generates differential data indicating a difference between the measurement data and the reference data.

When the differential data is generated, the waveform control unit 215 calculates a correction amount of a transmittance for each wavelength in the first wavelength selection switch 31 or the second wavelength selection switch 32.

When the waveform control unit 215 calculates the correction amount of the transmittance through the wavelength selection switch, the wavelength selection switch control unit 213 sets the first wavelength selection switch 31 and the second wavelength selection switch 32 in such a way as to obtain a transmittance in which the correction amount of the transmittance is reflected.

When the first wavelength selection switch 31 and the second wavelength selection switch 32 are set based on the new transmittance, operation of splitting and inserting an optical signal is performed similarly to that during normal operation, under a state in which a spectrum of a wavelength multiplexed signal to be outputted is adjusted.

The optical add/drop multiplexer 30 according to the present example embodiment controls a transmittance in each wavelength selection switch, based on spectrum data relating to an outputted signal, which is measured by the second wavelength selection switch 12 and the optical detector 21, and shapes a spectrum. Thus, the optical add/drop multiplexer 30 according to the present example embodiment is capable of improving transmission quality of a wavelength multiplexed signal by adjusting a spectrum of the wavelength multiplexed signal that is outputted from the own device.

Fourth Example Embodiment

Figure 9:
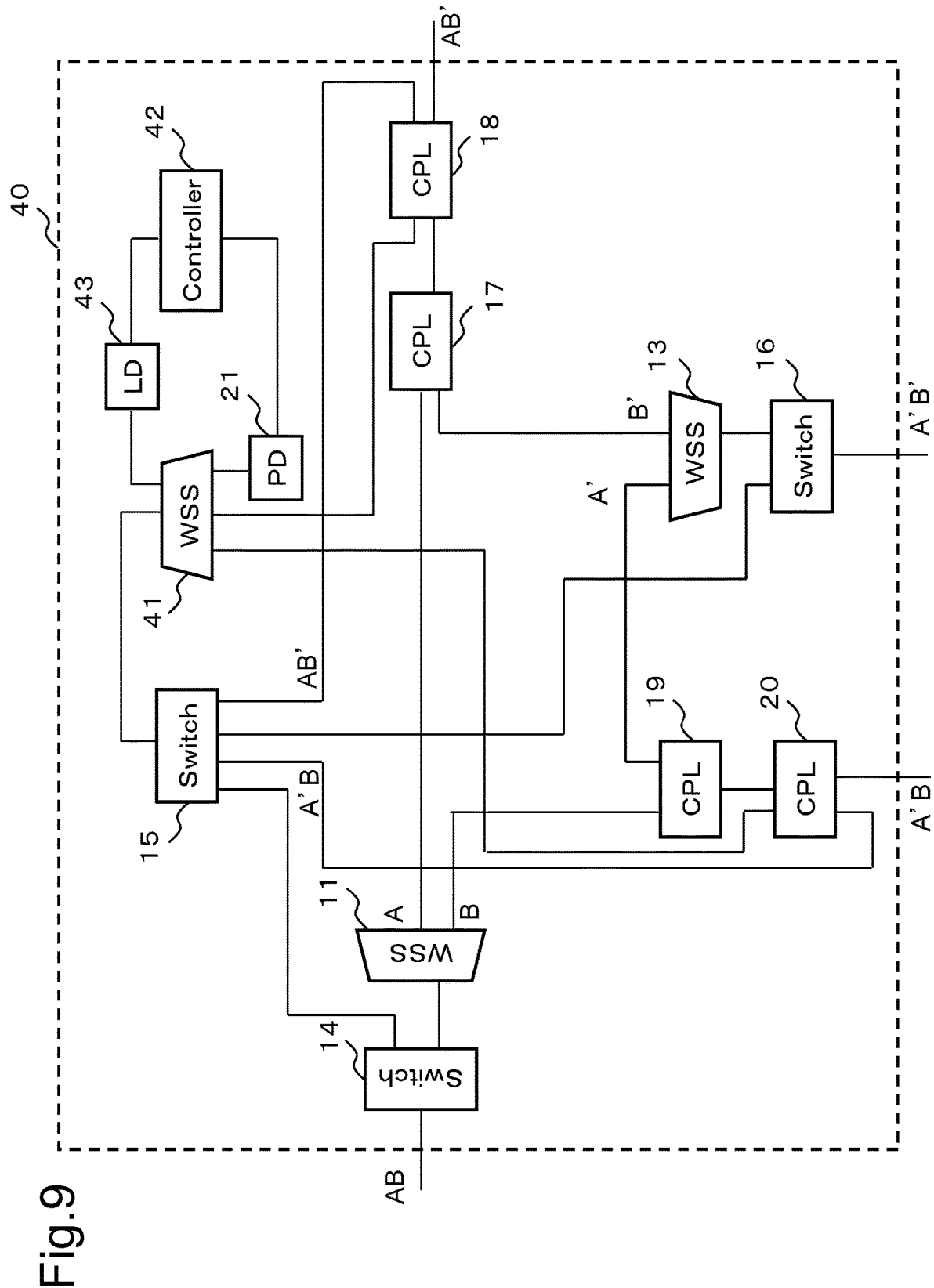
FIG. 9 is a diagram illustrating a configuration of an optical add/drop multiplexer according to a fourth example embodiment of the present invention.

With reference to the drawings, a fourth example embodiment of the present invention is described in detail. FIG. 9 illustrates an outline of a configuration of an optical add/drop multiplexer 40 according to the present example embodiment. The optical add/drop multiplexer 40 according to the present example embodiment is configured as a ROADM device capable of reconfiguring a wavelength setting. The optical add/drop multiplexer 40 according to the present example embodiment can be used in an optical transmission system similar to that of the second example embodiment. Specifically, in place of the optical add/drop multiplexer 10 of the optical transmission system according to the second example embodiment, the optical add/drop multiplexer 40 according to the present example embodiment can be used.

The optical add/drop multiplexer 10 according to the second example embodiment includes a standby wavelength selection switch and a function of measuring optical power. In addition to the functions similar to those in the second example embodiment, the optical add/drop multiplexer 40 according to the present example embodiment has a feature of including an optical signal output unit that outputs generated spectrum data.

The optical add/drop multiplexer 40 according to the present example embodiment includes the first wavelength selection switch 11, a second wavelength selection switch 41, the third wavelength selection switch 13, the first switch 14, the second switch 15, and the third switch 16. Further, the optical add/drop multiplexer according to the present example embodiment includes a first coupler 17, a second coupler 18, a third coupler 19, a fourth coupler 20, an optical detector 21, a control circuit 42, and a signal output unit 43.

Configurations and functions of the first wavelength selection switch 11, the third wavelength selection switch 13, the first switch 14, the second switch 15, the third switch 16, the first coupler 17, the second coupler 18, the third coupler 19, the fourth coupler 20, and the optical detector 21 according to the present example embodiment are similar to those of the second example embodiment.

In addition to the functions similar to those of the second wavelength selection switch 12 according to the second example embodiment, the second wavelength selection switch 41 outputs a signal, which is inputted from the signal output unit 43, to the second coupler 18 or the fourth coupler 20.

Figure 10:
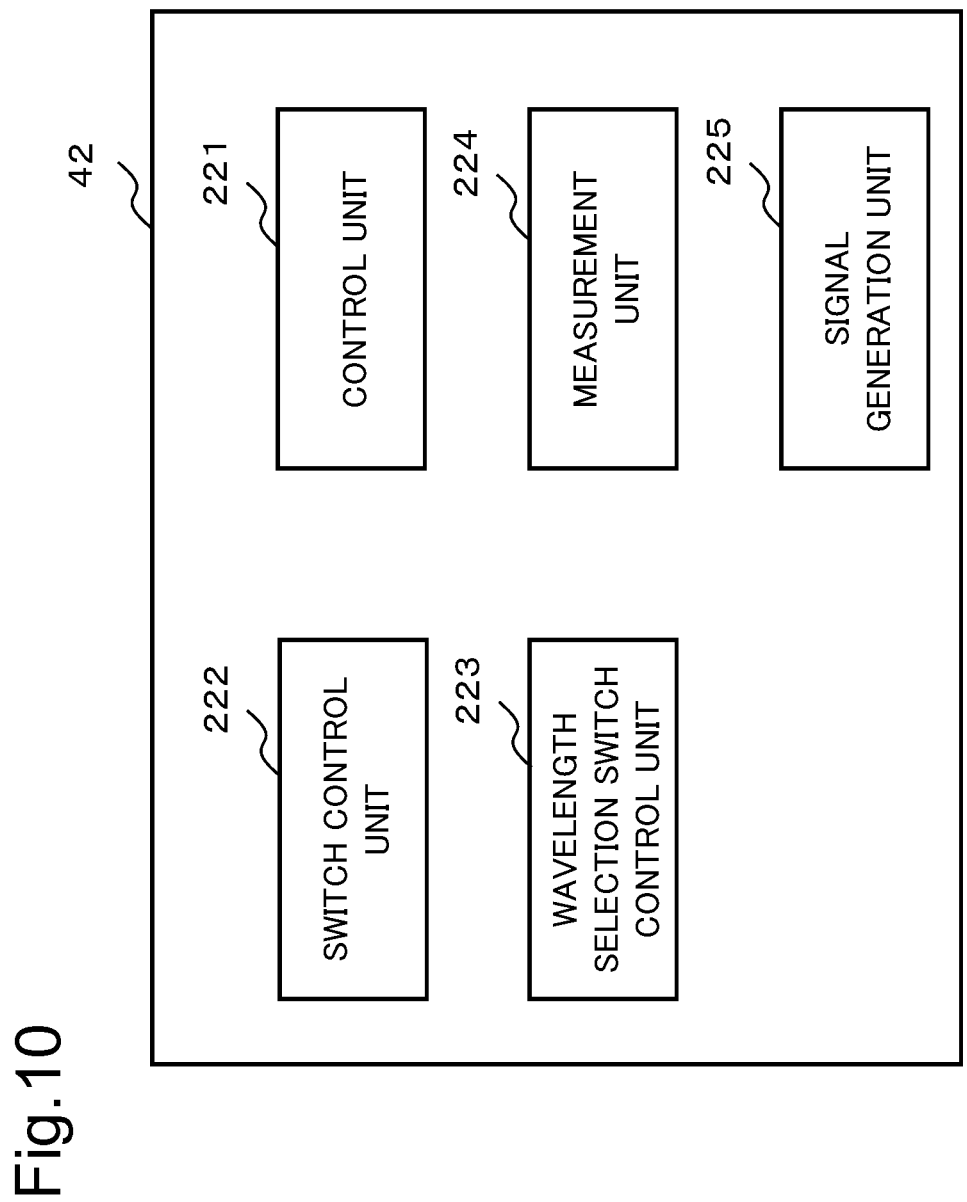
FIG. 10 is a diagram illustrating an example of a configuration of a control circuit according to the fourth example embodiment of the present invention.

In addition to the functions similar to those in the second example embodiment, the control circuit 42 has a function of controlling the signal output unit 43 and transmitting the spectrum data to the second trunk station 102 or the branch station 103. FIG. 10 is a diagram illustrating an example of a configuration of the control circuit 42 according to the present example embodiment. The control circuit 42 in FIG. 10 includes a control unit 221, a switch control unit 222, a wavelength selection switch control unit 223, a measurement unit 224, and a signal generation unit 225.

Configurations and functions of the switch control unit 222, the wavelength selection switch control unit 223, and the measurement unit 224 according to the present example embodiment are similar to the components given the same names in the second example embodiment.

In addition to the functions similar to those of the control unit 201 according to the second example embodiment, the control unit 221 transmits the spectrum data from the signal output unit 43 to a terminal device via the signal generation unit 225.

The signal generation unit 225 generates data for transmission, based on the spectrum data measured by the measurement unit 214, and outputs the data to the signal output unit 43.

The signal output unit 43 generates an optical signal for transmitting the spectrum data, based on control from the control circuit 42, and outputs the optical signal to the second wavelength selection switch 41. The signal output unit 43 includes a light source that outputs a continuous wave, and a modulator. A wavelength that is not used for transmission of a main signal is allocated to a wavelength of light that is outputted from the light source, based on a wavelength design of the optical transmission system. The signal output unit 43 generates a modulated optical signal acquired by modulation based on data for transmission, which is inputted from the control circuit 42, and outputs the modulated optical signal to the second wavelength selection switch 41.

Operation of the optical add/drop multiplexer 40 according to the present example embodiment is described. Operation of the optical add/drop multiplexer 40 according to the present example embodiment during normal operation, operation at a time of acquiring the spectrum data, and operation when an abnormality occurs in a wavelength selection switch are similar to those in the second example embodiment. Thus, the following description is only made on operation of transmitting the measured spectrum data to the terminal device via the second wavelength selection switch 41.

When the measurement unit 224 of the control circuit 42 generates the spectrum data, the signal generation unit 225 converts the spectrum data to data to be transmitted through a transmission path, and transmits the data to the signal output unit 43. When receiving the spectrum data for transmission, the signal output unit 43 generates a phase modulation signal based on the received data, and outputs the phase modulation signal to the second wavelength selection switch 41.

Further, the wavelength selection switch control unit 223 of the control circuit 42 controls the second wavelength selection switch 41 in such a way that the signal outputted from the signal output unit 43 is outputted to the second coupler 18 or the fourth coupler 20 that is relevant to a transmission destination.

The second wavelength selection switch 41 outputs the inputted optical signal to the second coupler 18 or the fourth coupler 20, based on control from the control circuit 42. The optical signal that is inputted to the second coupler 18 or the fourth coupler 20 is multiplexed with another wavelength multiplexed signal, is outputted to each transmission path, and is transmitted to the terminal device.

The optical add/drop multiplexer 40 according to the present example embodiment includes the signal output unit 43 that transmits the spectrum data and the like to the terminal device being an optical signal transmission destination via the second wavelength selection switch 41. Generation and transmission of the spectrum data are executed by using the second wavelength selection switch 41, which is included as a standby wavelength selection switch and is included for optical power measurement, and thus the device configuration required for data transmission can be simplified.

Figure 11:
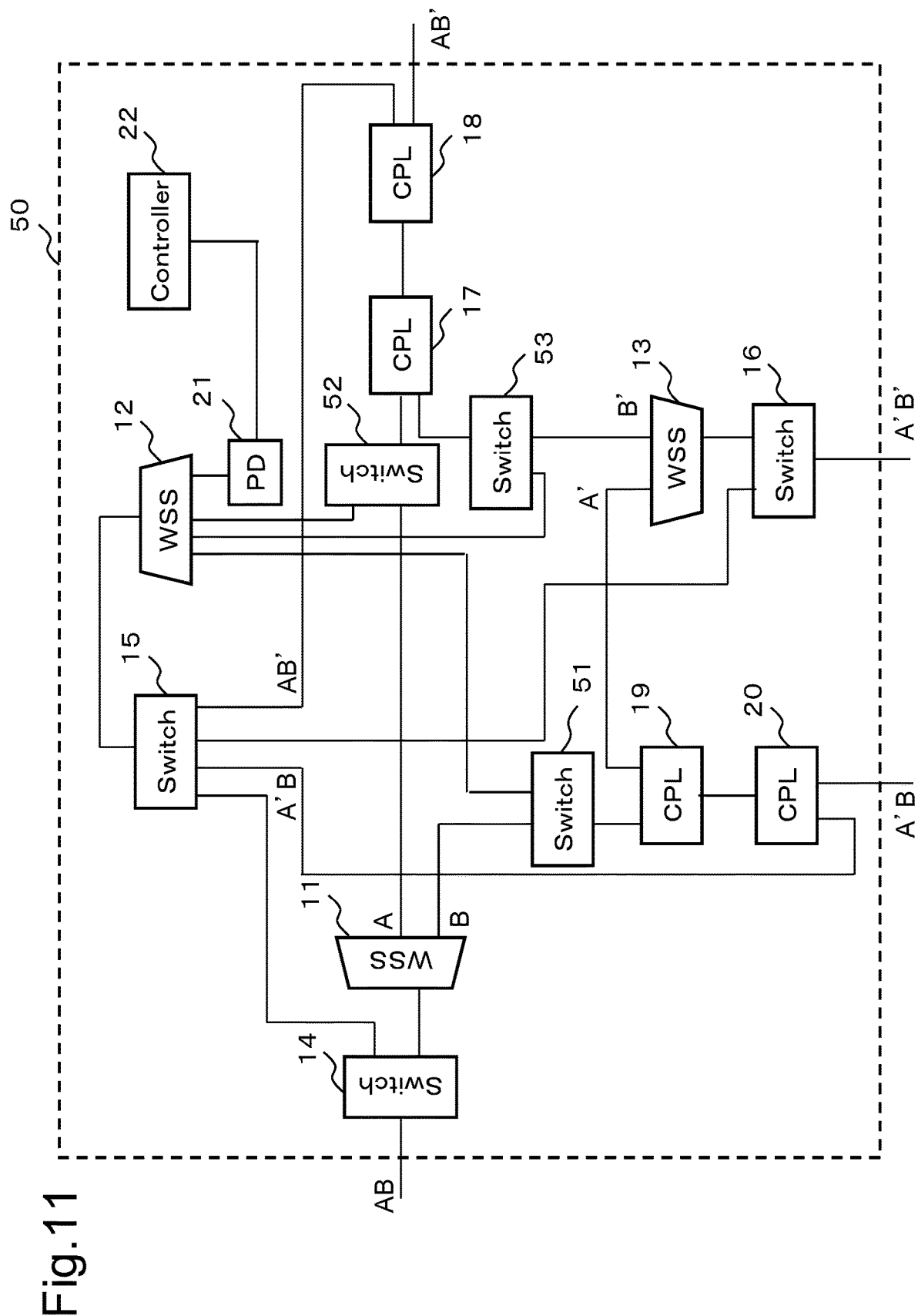
FIG. 11 is a diagram illustrating an example of another configuration of an optical add/drop multiplexer according to the present invention.

FIG. 11 illustrates an optical add/drop multiplexer 50 as an example of another configuration of the optical add/drop multiplexer according to the second example embodiment. The optical add/drop multiplexer 50 in FIG. 11 further includes a fourth switch 51, a fifth switch 52, and a sixth switch 53 at rear stages of the wavelength selection switches in an optical add/drop multiplexer having a configuration similar to that in the second example embodiment. The optical add/drop multiplexer 50 having a configuration as illustrated in FIG. 11 can also have functions similar to those of the optical add/drop multiplexer 10 according to the second example embodiment.

The optical add/drop multiplexer 30 according to the third example embodiment has a function of adjusting a spectrum of a wavelength multiplexed signal outputted from a wavelength selection switch, and the optical add/drop multiplexer 40 according to the fourth example embodiment has a function of transmitting generated spectrum data as an optical signal. In place of those configurations, the optical add/drop multiplexer may be configured in such a way as to have both the functions of the optical add/drop multiplexer according to the third example embodiment and the functions of the optical add/drop multiplexer according to fourth example embodiment.

The spectrum data based on the results measured in the second example embodiment to the fourth example embodiment may be used for the purpose of controlling a gain equalizer of an optical amplifier that is installed in the optical add/drop multiplexer or installed independently. Further, a spectrum shape in a main signal band may be controlled by using the second wavelength selection switch as a gain equalizer and controlling a passing loss at each port of the wavelength selection switch.

In the second example embodiment to the fourth example embodiment, when the optical add/drop multiplexer has a configuration capable of transmitting a wavelength multiplexed signal in both the directions between the trunk stations, one second wavelength selection switch being a standby switch is arranged in each direction. By switching an input and an output with switching elements that are arranged in front of and in rear of the second wavelength selection switch being a standby switch, a configuration in which one wavelength selection switch enables transmission in both the directions may be achieved.

Note that a part or an entirety of each of the example embodiments described above may be described as in the following supplementary notes, however, is not limited thereto.

(Supplementary Note 1)

An optical add/drop multiplexer including:
  a first wavelength selection means for outputting an optical signal of each wavelength of an inputted first wavelength multiplexed signal while selecting a path for each wavelength;
  a measurement means for measuring optical power of an inputted optical signal; and
  a second wavelength selection means including
    a means for outputting an optical signal of each wavelength of the first wavelength multiplexed signal while selecting a path for each wavelength, in place of the first wavelength selection means when an abnormality occurs in the first wavelength selection means, and
    a means for outputting an inputted second wavelength multiplexed signal for each prescribed wavelength unit to the measurement means when the first wavelength selection means normally operates.

(Supplementary Note 2)

The optical add/drop multiplexer according to Supplementary Note 1, further including a switching means for outputting, to the second wavelength selection means, the first wavelength multiplexed signal being inputted via a transmission path, when an abnormality occurs in the first wavelength selection means.

(Supplementary Note 3)

The optical add/drop multiplexer according to Supplementary Note 1 or 2, further including a transmission means for transmitting, to a terminal device connected via a transmission path, spectrum data being generated based on a measurement result of the optical power by the measurement means.

(Supplementary Note 4)

The optical add/drop multiplexer according to Supplementary Note 3, further including an optical output means for transmitting, to the terminal device, the spectrum data as an optical signal of a wavelength that is not used for a main signal.

(Supplementary Note 5)

The optical add/drop multiplexer according to Supplementary Note 3, further including a transmission means for transmitting the spectrum data to the terminal device, while modulating light from an excitation light source for optical power amplification and superposing the light as a low frequency component on a main signal.

(Supplementary Note 6)

The optical add/drop multiplexer according to any one of Supplementary Notes 1 to 5, wherein
  a transmittance of an optical signal of each wavelength in the first wavelength selection means is controlled based on a measurement result of the optical power by the measurement means.

(Supplementary Note 7)

The optical add/drop multiplexer according to any one of Supplementary Notes 1 to 6, further including
  a third wavelength selection means for outputting an optical signal of each wavelength of a third wavelength multiplexed signal that is inputted from a path different from an input path of the first wavelength multiplexed signal while selecting a path for each wavelength, wherein the second wavelength selection means further includes a means for outputting an optical signal of each wavelength of the third wavelength multiplexed signal while selecting a path for each wavelength, in place of the third wavelength selection means when an abnormality occurs in the third wavelength selection means.

(Supplementary Note 8)

An optical transmission system including:
the optical add/drop multiplexer according to any one of Supplementary Notes 1 to 7;
a first terminal device that transmits the first wavelength multiplexed signal to the optical add/drop multiplexer via a first transmission path;
a second terminal device that receives a fourth wavelength multiplexed signal from the optical add/drop multiplexer via a second transmission path; and
a third terminal device that receives a fifth wavelength multiplexed signal from the optical add/drop multiplexer via a third transmission path.

(Supplementary Note 9)

An optical transmission method including:
outputting an optical signal of each wavelength of an inputted first wavelength multiplexed signal from a first wavelength selection switch while selecting a path for each wavelength;
outputting, as a measurement signal, a second wavelength multiplexed signal after demultiplexing by a prescribed wavelength unit from a second wavelength selection switch, when the first wavelength selection switch operates normally;
measuring optical power of the measurement signal; and
outputting an optical signal of each wavelength of the first wavelength multiplexed signal from the second wavelength selection switch while selecting a path for each wavelength, in place of the first wavelength selection switch when an abnormality occurs in the first wavelength selection switch.

(Supplementary Note 10)

The optical transmission method according to Supplementary Note 9, further including outputting, to the second wavelength selection switch via a switch element, the first wavelength multiplexed signal being inputted via a transmission path, when an abnormality occurs in the first wavelength selection switch.

(Supplementary Note 11)

The optical transmission method according to Supplementary Note 9 or 10, further including:
generating spectrum data relating to the second wavelength multiplexed signal, based on a measurement result of the optical power; and
transmitting the spectrum data to a terminal device being connected via a transmission path.

(Supplementary Note 12)

The optical transmission method according to Supplementary Note 11, further including
an optical output means for transmitting, to the terminal device, the spectrum data as an optical signal of a wavelength that is not used for a main signal.

(Supplementary Note 13)

The optical transmission method according to Supplementary Note 11, further including
a transmission means for transmitting, to the terminal device, the spectrum data, while modulating light from an excitation light source for optical power amplification and superposing the light as a low frequency component on a main signal.

(Supplementary Note 14)

The optical transmission method according to any one of Supplementary Notes 9 to 13, further including
controlling a transmittance of an optical signal of each wavelength in the first wavelength selection switch, based on a measurement result of the optical power.

(Supplementary Note 15)

The optical transmission method according to any one of Supplementary Notes 9 to 14, further including:
outputting, from a third wavelength selection switch, an optical signal of each wavelength of a third wavelength multiplexed signal that is inputted from a path different from an input path of the first wavelength multiplexed signal while selecting a path for each wavelength; and
outputting, from the second wavelength selection switch, an optical signal of each wavelength of the third wavelength multiplexed signal while selecting a path for each wavelength, in place of the third wavelength selection switch when an abnormality occurs in the third wavelength selection switch.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2019-056433, filed on Mar. 25, 2019, the disclosure of which is incorporated herein in its entirety by reference.

REFERENCE SIGNS LIST

1 First wavelength selection means
2 Measurement means
3 Second wavelength selection means
10 Optical add/drop multiplexer
11 First wavelength selection switch
12 Second wavelength selection switch
13 Third wavelength selection switch
14 First switch
15 Second switch
16 Third switch
17 First coupler
18 Second coupler
19 Third coupler
20 Fourth coupler
21 Optical detector
22 Control circuit
31 First wavelength selection switch
32 Second wavelength selection switch
33 Third wavelength selection switch
34 Control circuit
41 Second wavelength selection switch
42 Control circuit
43 Signal output unit
51 Fourth switch
52 Fifth switch
53 Sixth switch
101 First trunk station
102 Second trunk station
103 Branch station
201 Control unit
202 Switch control unit
203 Wavelength selection switch control unit
204 Measurement unit
211 Control unit 212 Switch control unit
213 Wavelength selection switch control unit
214 Measurement unit
215 Waveform control unit
221 Control unit
222 Switch control unit
223 Wavelength selection switch control unit
224 Measurement unit
225 Signal generation unit

What is claimed is:

1. An optical add/drop multiplexer comprising:
a first wavelength selection switch configured to output an optical signal of each wavelength of an inputted first wavelength multiplexed signal while selecting a path for each wavelength;
a measurement circuit configured to measure optical power of an inputted optical signal;
a second wavelength selection switch including
a circuit configured to output an optical signal of each wavelength of the first wavelength multiplexed signal while selecting a path for each wavelength, in place of the first wavelength selection switch when an abnormality occurs in the first wavelength selection switch, and
a circuit configured to output an inputted second wavelength multiplexed signal for each prescribed wavelength unit to the measurement circuit when the first wavelength selection switch normally operates; and
a transmitter configured to transmit, to a terminal device connected via a transmission path, spectrum data being generated based on a measurement result of the optical power by the measurement circuit.

2. The optical add/drop multiplexer according to claim 1, further comprising a switch configured to output, to the second wavelength selection switch, the first wavelength multiplexed signal being inputted via a transmission path, when an abnormality occurs in the first wavelength selection switch.

3. The optical add/drop multiplexer according to claim 2, wherein
a transmittance of an optical signal of each wavelength in the first wavelength selection switch is controlled based on a measurement result of the optical power by the measurement circuit.

4. The optical add/drop multiplexer according to claim 2, further comprising
a third wavelength selection switch configured to output an optical signal of each wavelength of a third wavelength multiplexed signal that is inputted from a path different from an input path of the first wavelength multiplexed signal while selecting a path for each wavelength, wherein
the second wavelength selection switch further includes a circuit configured to output an optical signal of each wavelength of the third wavelength multiplexed signal while selecting a path for each wavelength, in place of the third wavelength selection switch when an abnormality occurs in the third wavelength selection switch.

5. An optical transmission system comprising:
the optical add/drop multiplexer according to claim 2;
a first terminal device that transmits the first wavelength multiplexed signal to the optical add/drop multiplexer via a first transmission path;
a second terminal device that receives a fourth wavelength multiplexed signal from the optical add/drop multiplexer via a second transmission path; and
a third terminal device that receives a fifth wavelength multiplexed signal from the optical add/drop multiplexer via a third transmission path.

6. The optical add/drop multiplexer according to claim 1, further comprising optical output circuit configured to transmit, to the terminal device, the spectrum data as an optical signal of a wavelength that is not used for a main signal.

7. The optical add/drop multiplexer according to claim 1, further comprising a transmitter configured to transmit the spectrum data to the terminal device, while modulating light from an excitation light source for optical power amplification and superposing the light as a low frequency component on a main signal.

8. The optical add/drop multiplexer according to claim 1, wherein
a transmittance of an optical signal of each wavelength in the first wavelength selection switch is controlled based on a measurement result of the optical power by the measurement circuit.

9. The optical add/drop multiplexer according to claim 1, further comprising
a third wavelength selection switch configured to output an optical signal of each wavelength of a third wavelength multiplexed signal that is inputted from a path different from an input path of the first wavelength multiplexed signal while selecting a path for each wavelength, wherein
the second wavelength selection switch further includes a circuit configured to output an optical signal of each wavelength of the third wavelength multiplexed signal while selecting a path for each wavelength, in place of the third wavelength selection switch when an abnormality occurs in the third wavelength selection switch.

10. An optical transmission system comprising:
the optical add/drop multiplexer according to claim 1;
a first terminal device that transmits the first wavelength multiplexed signal to the optical add/drop multiplexer via a first transmission path;
a second terminal device that receives a fourth wavelength multiplexed signal from the optical add/drop multiplexer via a second transmission path; and
a third terminal device that receives a fifth wavelength multiplexed signal from the optical add/drop multiplexer via a third transmission path.

11. An optical transmission method comprising:
outputting an optical signal of each wavelength of an inputted first wavelength multiplexed signal from a first wavelength selection switch while selecting a path for each wavelength;
outputting, as a measurement signal, a second wavelength multiplexed signal after demultiplexing by a prescribed wavelength unit from a second wavelength selection switch, when the first wavelength selection switch operates normally;
measuring optical power of the measurement signal;
outputting an optical signal of each wavelength of the first wavelength multiplexed signal from the second wavelength selection switch while selecting a path for each wavelength, in place of the first wavelength selection switch when an abnormality occurs in the first wavelength selection switch;
generating spectrum data relating to the second wavelength multiplexed signal, based on a measurement result of the optical power; and
transmitting the spectrum data to a terminal device being connected via a transmission path.

12. The optical transmission method according to claim 11, further comprising outputting, to the second wavelength selection switch via a switch element, the first wavelength multiplexed signal being inputted via a transmission path, when an abnormality occurs in the first wavelength selection switch.

13. The optical transmission method according to claim 11, further comprising
transmitting, to the terminal device, the spectrum data as an optical signal of a wavelength that is not used for a main signal.

14. The optical transmission method according to claim 11, further comprising
transmitting, to the terminal device, the spectrum data, while modulating light from an excitation light source for optical power amplification and superposing the light as a low frequency component on a main signal.

15. The optical transmission method according to claim 11, further comprising
controlling a transmittance of an optical signal of each wavelength in the first wavelength selection switch, based on a measurement result of the optical power.

16. The optical transmission method according to claim 11, further comprising:
outputting, from a third wavelength selection switch, an optical signal of each wavelength of a third wavelength multiplexed signal that is inputted from a path different from an input path of the first wavelength multiplexed signal while selecting a path for each wavelength; and
outputting, from the second wavelength selection switch, an optical signal of each wavelength of the third wavelength multiplexed signal while selecting a path for each wavelength, in place of the third wavelength selection switch when an abnormality occurs in the third wavelength selection switch.

* * * * *